United States Patent
Zhou (10) Patent No.: US 9,720,573 B2
(45) Date of Patent: Aug. 1, 2017

(54) METHOD FOR CONTROLLING PAGE FLIPPING OF TERMINAL AND TERMINAL

(71) Applicant: DONGGUAN GOLDEX COMMUNICATION TECHNOLOGY CO., LTD., Dongguan (CN)

(72) Inventor: Zhenqing Zhou, Dongguan (CN)

(73) Assignee: DONGGUAN GOLDEX COMMUNICATION TECHNOLOGY CO., LTD., Dongguan (CN)

( * ) Notice: Subject to any disclaimer, the term of this patent is extended or adjusted under 35 U.S.C. 154(b) by 60 days.

(21) Appl. No.: 14/833,328

(22) Filed: Aug. 24, 2015

(65) Prior Publication Data

US 2016/0048276 A1 Feb. 18, 2016

Related U.S. Application Data

(63) Continuation of application No. PCT/CN2014/070431, filed on Jan. 10, 2014.

(30) Foreign Application Priority Data

Mar. 29, 2013 (CN) .......................... 2013 1 0106875

(51) Int. Cl.
| | |
|---|---|
| *G06F 3/0483* | (2013.01) |
| *G06F 1/16* | (2006.01) |
| *G06F 3/0346* | (2013.01) |
| *G06F 3/01* | (2006.01) |
| *G06F 3/041* | (2006.01) |
| *G06F 3/0481* | (2013.01) |

(Continued)

(52) U.S. Cl.
CPC .......... *G06F 3/0483* (2013.01); *G06F 1/1694* (2013.01); *G06F 3/017* (2013.01); *G06F 3/0346* (2013.01); *G06F 3/0412* (2013.01); *G06F 3/0485* (2013.01); *G06F 3/0487* (2013.01); *G06F 3/04817* (2013.01)

(58) Field of Classification Search
None
See application file for complete search history.

(56) References Cited

U.S. PATENT DOCUMENTS

2009/0046537 A1* 2/2009 Chen ........................ G01S 15/58
367/90

* cited by examiner

*Primary Examiner* — Kenneth B Lee, Jr.
(74) *Attorney, Agent, or Firm* — Shimokaji IP (57) ABSTRACT

Embodiments of the present disclosure discloses a method for controlling page flipping of a terminal. The method includes: obtaining a distance or variation of distance between an object and a terminal and on a designated direction of the terminal; generating a page flipping operation instruction corresponding to the distance or variation of distance between the object and the terminal according to a preset corresponding relationship between the distance or variation of distance between the object and the terminal and page flipping operation instructions; executing the page flipping operation instruction. Embodiments of the present invention further discloses a terminal. Employing the present invention, a page flipping operation instruction corresponding to the distance or variation of distance between the object and the terminal may be generated, and the page flipping operation instruction is executed, making modes of page flipping be various, and improving experience of users of the terminal.

20 Claims, 3 Drawing Sheets

(51) Int. Cl.
*G06F 3/0485* (2013.01)
*G06F 3/0487* (2013.01)

METHOD FOR CONTROLLING PAGE FLIPPING OF TERMINAL AND TERMINAL

CROSS REFERENCE TO RELATED APPLICATIONS

This application is a continuing application of PCT Patent Application No. PCT/CN2014/070431, entitled "METHOD AND TERMINAL FOR CONTROLLING TERMINAL PAGE TURNING", filed on Jan. 10, 2014, which claims priority to Chinese Patent Application No. 201310106875.5, filed on Mar. 29, 2013, both of which are hereby incorporated in its entireties by reference.

FIELD OF THE TECHNICAL

The present invention relates to electronic technology field, and particularly to a method for controlling page flipping of a terminal and a terminal.

BACKGROUND

At present, mobile phones already become a necessity in people's life, and the functions of the mobile phones also become more and more powerful. Previously, the mobile phones can be only used to make phone calls and send short messages. Nowadays, the mobile phones can play music, play videos, have Bluetooth function, can take photos, can be connected with the Internet, can be used for reading, and so on. The functions of the mobile phones become more powerful, the kinds of applications in the mobile phones become more and more. At Present, there are a variety of applications in the mobile phones, and the mobile phones' icons each having an application associated therewith become more and more, and most of the applications include a number of pages, and users need to flip through a number of pages when browsing. For example, when we want to browse pictures, we need to flip through a number of pages when browsing since there may be thousands of pictures. When we read an electronic book, we need to flip through a number of pages when reading since the electronic book may include thousands of pages or hundreds of thousands of pages. When we want to search contact information of a friend from a contact menu, we need to flip through a number of pages when searching the friend since there may be thousands of contact information in the contact menu.

In the present technology, when we want to find a target page and some object of the target page by page flipping, or when we browse some information, we usually use a finger to touch the screen of the mobile phone. By moving the finger on the screen the pages can be flipped, or by shaking the mobile phone, and using a built-in sensor of the mobile phone to sense the shake of the mobile phone, the pages can be flipped according to the shake data of the mobile phone, or by entering a page number manually or using a progress bar for page switching the pages can be flipped. The page flipping method in the present technology may need the finger to keep touching the screen of the mobile phone if there are a great number of pages to be browsed. To switch pages at a higher speed, it needs the finger to touch the screen at a higher speed, which is easy to cause the finger of touching the screen to feel tired, and is also easy to wear out the touch screen of the mobile phone, and the accuracy is also lower. When wearing a glove, the difficulty of touching the screen of the mobile phone increases, and it is more easy to wear out the touch screen of the mobile phone. Or when there are a great number of pages to be browsed, it needs the user to shake the mobile phone many times to flip pages, or shake the mobile phone at a great acceleration to increase the page flipping speed, or drag the progress bar for page switching manually to flip pages, which are all easy to increase pressure on the hand, and the accuracy of page flipping is low. For the control method of page flipping in the above existed technology, it is difficult to control the page flipping speed, the page flipping efficiency is low, and it is easy to cause the hand of the user to feel tired, thus user's experience is not good.

SUMMARY

The embodiments of the present disclosure provide a method for controlling page flipping of a terminal and a terminal. A page flipping operation instruction may be generated according to the distance between an object and the terminal, and the corresponding page flipping operation instruction is executed, causing modes of page flipping be various, increasing the efficiency of page flipping, and improving experience of users of the terminal.

The embodiments of the present invention provides a method for controlling page flipping of a terminal, the method comprises the following steps.

Obtaining the distance or variation of distance between an object and the terminal and on a designated direction of the terminal.

Generating a page flipping operation instruction corresponding to the distance or variation of distance between the object and the terminal according to a preset corresponding relationship between the distance or variation of distance between the object and the terminal and page flipping operation instructions.

Executing the page flipping operation instruction.

The embodiments of the present invention further provides a terminal. The terminal includes the following units.

An obtaining unit is configured to obtain the distance or variation of distance between an object and the terminal and on a designated direction of the terminal.

A processing unit is configured to generate a page flipping operation instruction corresponding to the distance or variation of distance between the object and the terminal according to a preset corresponding relationship between the distance or variation of distance between the object and the terminal and page flipping operation instructions.

An executing unit is configured to execute the page flipping operation instruction.

The embodiments of the present invention further provides a terminal. The terminal includes a storage unit storing a plurality of computer-readable program codes, and a processor electrically connected to the storage unit and configured to execute the plurality of computer-readable program codes to: obtain a distance or variation of distance between an object and a terminal and on a designated direction of the terminal, generate a page flipping operation instruction corresponding to the distance or variation of distance between the object and the terminal according to a preset corresponding relationship between the distance or variation of distance between the object and the terminal and page flipping operation instructions, and execute the page flipping operation instruction.

The embodiments of the present invention generates the page flipping operation instruction according to the distance or variation of distance between the object and the terminal in combination with the corresponding relationship between the distance or variation of distance between the object and the terminal and the page flipping operation instructions, and the page flipping operation instruction is executed, causing modes of page flipping be various, increasing the efficiency of page flipping, and improving experience of users of the terminal.

BRIEF DESCRIPTION OF THE DRAWINGS

To better illustrate the technical solution of embodiments of the present invention, the following descriptions will briefly illustrate the accompanying drawings described in the embodiments. Obviously, the following described accompanying drawings are some embodiments of the present invention. Those skilled in the art can obtain other accompanying drawings according to the described accompanying drawings without creative work.

DETAILED DESCRIPTION OF ILLUSTRATED EMBODIMENTS

The technical solution of embodiments of the present invention will be described clearly and completely in combination with the accompanying drawings of the embodiments of the present invention. Obviously, the described embodiments are a part of embodiments of the present invention, and not all of the embodiments. According to the embodiments of the present invention, other embodiments obtained by those skilled in the art without creative work all fall within the protection scope of the present invention.

The terminal described in the embodiments of the present invention may be a mobile phone, a tablet PC, a laptop, a digital camera, or other terminal which needs to switch pages frequently. The above-mentioned terminals are just examples, not all of terminals are listed, and the terminal in the embodiments of the present invention may be, without limitation, one of the above-mentioned terminals. The mobile phone will be used as an example to specifically describe and illustrate the method for controlling page flipping of the terminal and the terminal provided by the embodiments of the present invention.

Figure 1:
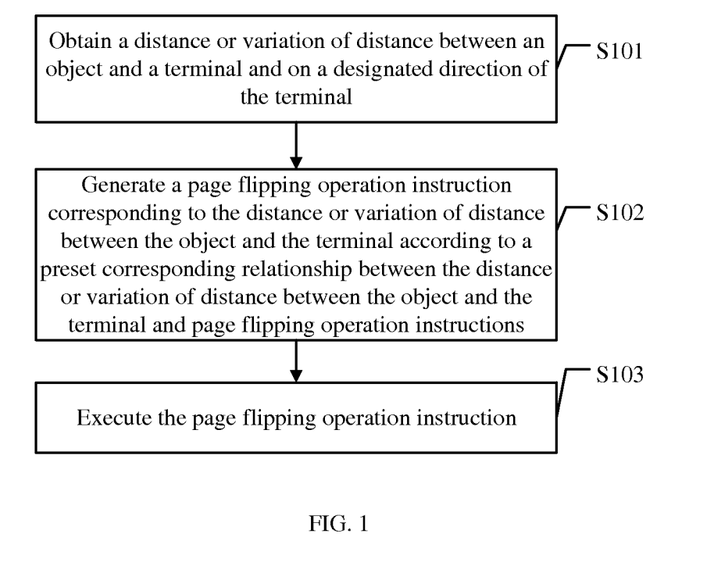
FIG. 1 is an embodiment of a flowchart of a method for controlling page flipping of a terminal provided by an embodiment of the present invention.

Referring to FIG. 1, an embodiment of a flowchart of a method for controlling page flipping of a terminal provided by an embodiment of the present invention is shown. The method for controlling page flipping of the terminal described in this embodiment includes the following steps.

Step S101, obtaining a distance or variation of distance between an object and the terminal and on a designated direction of the terminal.

In detail, by a distance sensor or G-sensor of a mobile phone, or by other ways the distance or variation of distance between an object (e.g., the object for touching the mobile phone, such as a user's finger for example) and the mobile phone and on the designated direction may be obtained. The designated direction may include a motion direction of the mobile phone or a measurement direction of the mobile phone. For example, by the distance sensor of the mobile phone, the distance or variation of distance between the object and the mobile phone and on the measurement direction of the distance sensor may be obtained, or when the mobile phone is in a motion state, by the G-sensor of the mobile phone, the distance or variation of distance between the object and the mobile phone and on the motion direction of the mobile phone may be obtained. In detail, a page flipping triggering distance for triggering the mobile phone to start an automatic page flipping function may be preset, that is, only when the distance or variation of distance between the mobile phone and the object obtained by the distance sensor or G-sensor of the mobile phone satisfies the preset triggering distance, the mobile phone starts the automatic page flipping function. After the mobile phone obtains the distance or variation of distance between the object and the mobile phone on the designated direction, the mobile phone determines whether or not the distance or variation of distance between the mobile phone and the object is less than or equals to the preset page flipping triggering distance. Specifically, the page flipping triggering distance may be preset according to a usage range of the distance sensor, or according to specific condition of other ways, that is, when the distance or variation of distance between the mobile phone and the object is less than or equals to the preset triggering distance, the mobile phone is triggered to start the page switching function. For example, when the usage range of the distance sensor is 10 cm, the page flipping triggering distance may be set to be 8 cm, that is, when a distance between a user's finger or other object for controlling the mobile phone (that is the object) and the mobile phone is less than or equals to 8 cm, the distance between the object and the mobile phone is determined to satisfy the preset page flipping triggering distance, and the page flipping function of the mobile phone is started.

Step S102, generating a page flipping operation instruction corresponding to the distance or variation of distance between the object and the terminal, according to a preset corresponding relationship between the distance or variation of distance between the object and the terminal and page flipping operation instructions.

Step 103, executing the page flipping operation instruction.

In detail, after the mobile phone determines that the distance or variation of distance between the object and the mobile phone satisfies the preset page flipping triggering distance, the mobile phone determines a page switching mode according to the preset corresponding relationship between the distance or variation of distance between the object and the mobile phone and the page flipping operation instructions, generates a corresponding page flipping operation instruction, and executes the corresponding page flipping operation instruction, to switch the page to a target page. In detail, the page flipping operation instructions may include page flipping directions, page flipping speeds, page count of page flipping, page flipping according to proportions.

In detail, according to the preset corresponding relationship between the distance or variation of distance between the object and the terminal and the page flipping operation instructions, the modes of generating the page flipping operation instruction corresponding to the distance or variation of distance between the object and the terminal may include a number of generating modes. In detail, the corresponding relationship between the distance or variation of distance between the object and the terminal and the page flipping operation instructions may be preset. Specifically, page flipping speeds each corresponding to one distance or variation of distance between the object and the terminal may be preset. Wherein, the corresponding relationship between the distance or variation of distance between the object and the terminal and the page flipping speed may include the linear corresponding relationship, the exponential corresponding relationship, and other corresponding relationships. When the corresponding relationship between the distance or variation of distance between the object and the mobile phone and the page flipping operation instructions is the corresponding relationship between the distance or variation of distance between the object and the mobile phone and the page flipping speed, the page flipping speed corresponding to the distance or variation of distance may be determined according to the obtained real-time distance or variation of distance between the object, e.g., the user's finger, and the mobile phone, in combination with the above described corresponding relationship, the corresponding page flipping operation instruction is generated, and the current page is switched to the target page according to the corresponding page flipping speed. For example, if the corresponding relationship between the distance or variation of distance between the object and the mobile phone and the page flipping operation instructions is the corresponding relationship between the distance or variation of distance between the object and the mobile phone and the page flipping speed, and the corresponding relationship is the linear corresponding relationship, the corresponding relationship between the distance or variation of distance between the object and the terminal and the page flipping speed may be set to be $X=KL+M$, wherein, $X$ is the page flipping speed, $K$ is a constant coefficient of the corresponding relationship between the distance or variation of distance between the object and the terminal and the page flipping speed, $L$ is the real-time distance or real-time variation of distance between the object and the terminal, $M$ is the initial page flipping speed (the initial page flipping speed may be zero, or other constant, and may be set according to specific situation). After the distance or variation of distance between the object and the terminal is obtained, the page flipping speed corresponding to the current distance or variation of distance between the object and the terminal may be determined according to the above-mentioned equation of the linear corresponding relationship. If the corresponding relationship between the distance or variation of distance between the object and the mobile phone and the page flipping operation instructions is the corresponding relationship between the distance or variation of distance between the object and the terminal and the page flipping speed, and the corresponding relationship is the exponential corresponding relationship, the corresponding relationship between the distance or variation of distance between the object and the terminal and the page flipping speed may be set to be $X=K^L+M$, wherein, $X$ is the page flipping speed, $K$ is a constant coefficient of the corresponding relationship between the distance or variation of distance between the object and the terminal and the page flipping speed, $L$ is the real-time distance or real-time variation of distance between the object and the terminal, $M$ is the initial page flipping speed (the initial page flipping speed may be zero, or other constant, and may be set according to specific situation). After the distance or variation of distance between the object and the terminal is obtained, the page flipping speed corresponding to the current distance or variation of distance between the object and the terminal may be determined according to the above-mentioned equation of the exponential corresponding relationship. According to the above-mentioned corresponding relationships, it can be set that when the distance between the object, e.g., the user's finger, and the mobile phone is closer to zero, the corresponding page flipping speed is higher, and when the distance between the object, e.g., the user's finger, and the mobile phone is closer to the page flipping trigger distance, the corresponding page flipping speed is lower. That is, when the user of the mobile phone wants to switch pages, the user puts his/her finger on the distance sensor of the mobile phone, causing the distance between the finger and the mobile phone to be less than or equal to the preset page flipping triggering distance. To switch pages quickly, the user moves the finger to be close to the distance sensor to decrease the distance between the finger and the mobile phone, thus the page flipping speed increases. When the current page is close to the target page, the user moves the finger away from the distance sensor of the mobile phone to increase the distance between the finger and the mobile phone, thus the page flipping speed decreases.

In detail, when the corresponding relationship between the distance or variation of distance between the object and the terminal and the page flipping operation instructions is preset, the distance or variation of distance between the object and the terminal may be divided into a number of distance intervals in advance, and page flipping speeds or page flipping directions each corresponding to one distance interval are set. Wherein, the corresponding relationship between the distance intervals and the page flipping speed may include the linear corresponding relationship, the exponential corresponding relationship, and other corresponding relationships. When the corresponding relationship between the distance intervals and the page flipping speed is the linear corresponding relationship, the corresponding relationship may be set to be $X=KN+M$, wherein, $X$ is the page flipping speed, $K$ is a constant coefficient of the corresponding relationship between the distance or variation of distance between the object and the terminal and the page flipping speed, $N$ is the distance interval of the distance or variation of distance between the object and the terminal, $M$ is the initial page flipping speed (the initial page flipping speed may be zero, or other constant, and may be set according to specific situation). After the real-time distance or real-time variation of distance between the object and the terminal is obtained, which of the distance intervals the distance or variation of distance falls within is determined, and the page flipping speed corresponding to the current distance or variation of distance between the object and the terminal is determined according to the above-mentioned equation of the linear corresponding relationship. When the corresponding relationship between the distance intervals and the page flipping speed is the exponential corresponding relationship, the corresponding relationship may be set to be $X=K^N+M$, wherein, $X$ is the page flipping speed, $K$ is a constant coefficient of the corresponding relationship between the distance or variation of distance between the object and the terminal and the page flipping speed, $N$ is the distance interval of the distance or real-time variation of distance between the object and the terminal, $M$ is the initial page flipping speed (the initial page flipping speed may be zero, or other constant, and may be set according to specific situation). After the real-time distance or real-time variation of distance between the object and the terminal is obtained, which of the distance intervals the distance or variation of distance falls within is determined, and the page flipping speed corresponding to the current distance or variation of distance between the object and the terminal is determined according to the above-mentioned equation of the exponential corresponding relationship. In detail, when the preset corresponding relationship between the distance or variation of distance between the object and the mobile phone and the page flipping operation instructions is the corresponding relationship between the distance intervals of the distance or variation of distance between the object and the terminal and the page flipping speed, the corresponding relationship may be set to be the other corresponding relationship. The page flipping triggering distance may be divided into a number of distance intervals in advance, and page flipping speeds each corresponding to one distance interval are set. After the distance or variation of distance between the object and the mobile phone is obtained, which of the distance intervals the obtained distance or variation of distance falls within may be determined, and the page flipping speed corresponding to the current distance or variation of distance between the object and the mobile phone may be determined according to the page flipping speed corresponding to the determined distance interval in combination with the above-mentioned corresponding relationship, and the corresponding page flipping operation instruction is generated. For example, the page flipping triggering distance (e.g., 8 cm) may be divided into a first distance interval (0-4 cm), a second distance interval (4-6 cm), a third distance interval (6-8 cm), and so on in advance. The page flipping speed corresponding to the distance interval of 0-4 cm (that is the first distance interval) is set to be 10 pictures per second, the page flipping speed corresponding to the distance interval of 4-6 cm (that is the second distance interval) is set to be 5 pictures per second, and the page flipping speed corresponding to the distance interval of 6-8 cm (that is the third distance interval) is set to be one picture per second. When the distance between the user's finger or other object and the mobile phone is 3 cm, the distance interval corresponding to the current distance between the object and the mobile phone is determined to be the first distance interval, and the corresponding page flipping speed is 10 pictures per second, and the pages may be switched according to the page flipping speed of 10 pictures per second. When the distance between the user's finger and the mobile phone increases to 7 cm, the distance interval corresponding to the current distance between the object and the mobile phone is determined to be the third distance interval, and the corresponding page flipping speed is 1 picture per second, and the pages may be switched according to the corresponding page flipping speed, and the page flipping speed decreases from 10 pictures per second to 1 picture per second. When the user wants to increase the page flipping speed, the user may move the finger to decrease the distance between the finger and the mobile phone.

In addition, when the preset corresponding relationship between the distance or variation of distance between the object and the mobile phone and the page flipping operation instructions is set to be the corresponding relationship between the distance or variation of distance between the object and the terminal and the page flipping direction, the page flipping triggering distance may be divided into two distance intervals in advance, and two page flipping directions each corresponding to one distance interval are set. After the distance between the object and the mobile phone is obtained, which of the distance intervals the obtained distance falls within is determined, the page flipping direction corresponding to the current distance between the object and the mobile phone is determined according to the page flipping direction corresponding to the determined distance interval, and the corresponding page flipping operation instruction is generated. For example, the page flipping triggering distance (e.g., 8 cm) may be equally divided into two distance intervals, for example, the fourth distance interval (0-4 cm) and the fifth distance interval (4-8 cm). The page flipping direction corresponding to 0-4 cm (that is the fourth distance interval) is set to be one direction (e.g., page up), and the page flipping direction corresponding to 4-8 cm is set to be another direction (e.g., page down). When the distance between the user's finger or other object and the mobile phone falls within the fourth distance interval, the current page flipping direction is page up, and when the distance between the object and the mobile phone falls within the fifth distance interval, the current page flipping direction is page down. For example, when the obtained distance between the user's finger and the mobile phone is 3 cm, the file is scrolled up to switch the current page to the target page. When the obtained distance between the user's finger and the mobile phone is 5 cm, the file is scrolled down to switch the current page to the target page.

In detail, when the corresponding relationship between the distance or variation of distance between the object and the terminal and the page flipping operation instructions is preset, the total number of pages of a file is assigned according to the proportion relationship between the distance or variation of distance between the object and the terminal and a reference distance (e.g., the above-mentioned preset page flipping triggering distance), and each corresponding proportion is set to correspond to a page count of page flipping or a target page number of page flipping. Specifically, the page number corresponding to the proportion between the distance or variation of distance between the object and the mobile phone and the preset page flipping triggering distance may be preset (the page count of page flipping may be determined according to the corresponding page number), that is, each proportion may be preset to correspond to a page number. After the distance or variation of distance between the object and the mobile phone is obtained, the proportion relationship between the obtained distance or variation of distance and the preset page flipping triggering distance may be determined, and the corresponding page number is determined according to the determined proportion relationship. After the page number corresponding to the current distance or variation of distance between the object and the mobile phone is determined, the current page is switched to the page of the page number, that is, the target page. For example, it can be set that when the distance between the object and the mobile phone is 0, that is, the proportion between the distance between the object and the mobile phone and the page flipping triggering distance is 0, the corresponding page number is the last page number of an electronic book, that is, the page count of page flipping is the total number of pages of the electronic book. When the distance between the object and the mobile phone is 8 cm, that is, the proportion between the distance between the object and the mobile phone and the page flipping triggering distance is 1, the corresponding page number is the first page number of the electronic book, that is, the page count of page flipping is 1. When the distance between the object and the mobile phone is 4 cm, that is, the proportion between the distance between the object and the mobile phone and the page flipping triggering distance is 1:2, the corresponding page number is the page number of half of the electronic book, that is, the page count of page flipping is half of the total number of pages of the electronic book. When the proportion between the distance between the object and the mobile phone and the page flipping triggering distance is not an integer, the corresponding page number is the page number indicated by an integer which is the integer the proportion is rounded up or down to, and the page count of page flipping is the page count corresponding to the page number. When the distance between the user's finger and the mobile phone is 2 cm, the proportion between the current distance (2 cm) and the preset page flipping triggering distance (8 cm) is determined to be 1:4, and the current page is switched to the page of the page number of a quarter of the total number of pages of the electronic book. When the distance between the user's finger and the mobile phone is 6 cm, the proportion between the current distance (6 cm) and the preset page flipping triggering distance (8 cm) is 3:4, the current page is switched to the page of the page number of three quarters of the total number of pages of the electronic book.

In detail, the above-mentioned methods of setting the corresponding relationship between the distance or variation of distance between the object and the terminal and the page flipping operation instructions may be used alone, or may be used in combination with each other, to make modes of page flipping be more flexible and various. After the corresponding relationship between the distance or variation of distance between the object and the terminal and the page flipping operation instructions is set, the corresponding mode of page flipping may be determined according to the corresponding relationship in combination with the distance or variation of distance between the object and the mobile phone, the corresponding page flipping operation instruction is generated, and the corresponding page flipping operation instruction is executed to switch the current page to the target page.

In the embodiments of the present invention, the corresponding relationship between the distance or variation of distance between the object and the terminal and the page flipping operation instructions is preset, the corresponding switch mode is determined according to the obtained distance or variation of distance between the object (e.g., the user's finger) and the mobile phone, and the corresponding page flipping operation instruction is generated, and the corresponding page flipping operation instruction is executed to switch the current page to the target page, making the modes of page flipping modes be various, increasing the efficiency of page flipping, and improving user's experience.

Figure 2:
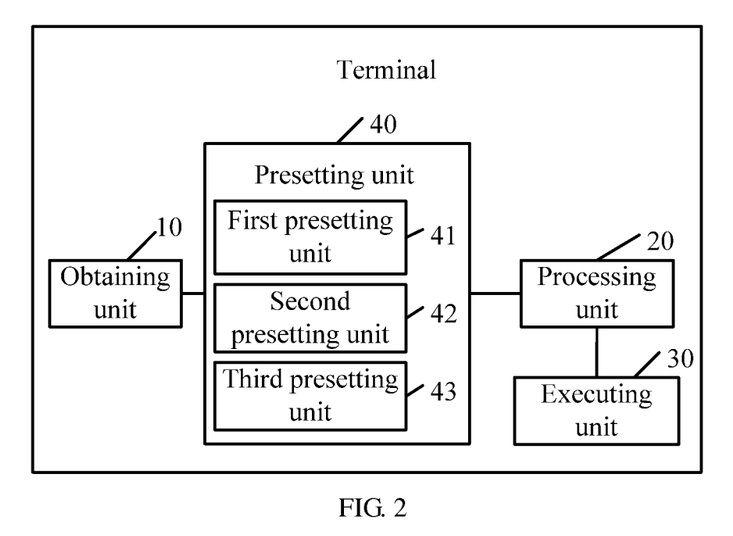
FIG. 2 is an embodiment of a schematic view of a structure of a terminal provided by an embodiment of the present invention.

Referring to FIG. 2, an embodiment of a schematic view of a structure of a terminal provided by an embodiment of the present invention is shown. The terminal described in the embodiment includes the following units.

An obtaining unit 10 is configured to obtain a distance or variation of distance between an object and the terminal and on a designated direction of the terminal.

A processing unit 20 is configured to generate a page flipping operation instruction corresponding to the distance or variation of distance between the object and the terminal according to the corresponding relationship between the distance or variation of distance between the object and the terminal and page flipping operation instructions.

An executing unit 30 is configured to execute the page flipping operation instruction.

In addition, the terminal described in the embodiment further includes the following unit.

A presetting unit 40 is configured to preset the corresponding relationship between the distance or variation of distance between the object and the terminal and the page flipping operation instructions.

Wherein, the presetting unit 40 may include the following units.

A first presetting unit 41 is configured to set page flipping speeds each corresponding to one distance or variation of distance between the object and the terminal.

A second presetting unit 42 is configured to divide the distance or variation of distance between the object and the terminal into a number of distance intervals, and set page flipping speeds or page flipping directions each corresponding to one distance interval.

A third presetting unit 43 is configured to assign the total number of pages of a file according to the proportion relationship between the distance or variation of distance between the object and the terminal and a reference distance (e.g., the above-mentioned preset page flipping trigger distance), and set that each corresponding proportion corresponds to a page count of page flipping or a target page number of page flipping.

In detail, the presetting unit 40 may include any one of the first presetting unit 41, the second presetting unit 42, and the third presetting unit 43, or a combination of two or more of the first presetting unit 41, the second presetting unit 43, and the third presetting unit 43. The presetting unit 40 may also include all of the first presetting unit 41, the second presetting unit 43, and the third presetting unit 43.

In detail, the obtaining unit 10 may obtain the distance or variation of distance between an object (e.g., the object for touching the mobile phone, such as a user's finger for example) and the mobile phone and on the designated direction by a distance sensor or G-sensor of the mobile phone, or by other ways. Wherein, the designated direction may include a motion direction of the mobile phone or a measurement direction of the mobile phone. For example, the obtaining unit 10 may obtain the distance or variation of distance between the object and the mobile phone and on the measurement direction of the distance sensor by the distance sensor of the mobile phone, or when the mobile phone is in a motion state, the obtaining unit 10 may obtain the distance or variation of distance between the object and the mobile phone and on the motion direction of the mobile phone by the G-sensor of the mobile phone. In detail, the obtaining unit 10 may further preset a page flipping triggering distance for triggering the mobile phone to start an automatic page flipping function, that is, only when the distance or variation of distance between the mobile phone and the object obtained by the distance sensor or the G-sensor of the mobile phone satisfies the preset triggering distance, the mobile phone starts the automatic page flipping function. After the obtaining unit 10 obtains the distance or variation of distance between the object and the mobile phone and on the designated direction, whether or not the distance or variation of distance between the mobile phone and the object is less than or equals to the preset page flipping triggering distance may be determined Specifically, the obtaining unit 10 may preset the page flipping triggering distance according to a usage range of the distance sensor, or according to specific condition of other ways, that is, when the obtaining unit 10 determines that the distance or variation of distance between the mobile phone and the object is less than or equals to the preset triggering distance, the mobile phone is triggered to start the page switch function. For example, when the usage range of the distance sensor is 10 cm, the page flipping triggering distance may be set to be 8 cm, that is, when a distance between a user's finger or other object for controlling the mobile phone and the mobile phone is less than or equals to 8 cm, the distance between the object and the mobile phone is determined to satisfy the preset page flipping triggering distance, and the page flipping function of the mobile phone is started.

In detail, after the obtaining unit 10 determines that the distance or variation of distance between the object and the mobile phone satisfies the preset page flipping triggering distance, the processing unit 20 determines a page switch mode according to the corresponding relationship between the distance or variation of distance between the object and the mobile phone and the page flipping operation instructions preset by the presetting unit 40, and generates a corresponding page flipping operation instruction. After the processing unit 20 generates the corresponding page flipping operation, the executing unit 30 executes the corresponding page flipping operation, to switch the current page to the target page. In detail, the page flipping operation instructions may include page flipping directions, page flipping speeds, page count of page flipping, page flipping according to proportions.

In detail, according to the corresponding relationship between the distance or variation of distance between the object and terminal and the page flipping operation instructions preset by the presetting unit 40, the modes of the processing unit 20 generating the page flipping operation instruction corresponding to the distance or variation of distance between the object and the terminal may include a number of generating modes. In detail, when the presetting unit 40 sets the corresponding relationship between the distance or variation of distance between the object and the terminal and the page flipping operation instructions, the first presetting unit 41 presets the page flipping speeds each corresponding to one distance or variation of distance between the object and the terminal. Wherein, the corresponding relationship between the distance or variation of distance between the object and the terminal and the page flipping speed may include the linear corresponding relationship, the exponential corresponding relationship, and other corresponding relationships. Specifically, when the presetting unit 40 sets the corresponding relationship between the distance or variation of distance between the object and the mobile phone and the page flipping operation instructions to be the corresponding relationship between the distance or variation of distance between the object and the terminal and the page flipping speed by the first presetting unit 41, the processing unit 20 determines the page flipping speed corresponding to the distance or variation of distance according to the real-time distance or variation of distance between the object, e.g., the user's finger, and the mobile phone obtained by the obtaining unit 10, in combination with the above-mentioned corresponding relationship, and generates the corresponding page flipping operation instruction. The executing unit 30 executes the corresponding page flipping operation instruction to switch the current page to the target page. For example, if the corresponding relationship between the distance or variation of distance between the object and the mobile phone and the page flipping operation instructions preset by the first presetting unit 41 is the corresponding relationship between the distance or variation of distance between the object and the terminal and the page flipping speed, and the corresponding relationship is the linear corresponding relationship, the corresponding relationship between the distance or variation of distance between the object and the mobile phone and the page flipping speed may be set to be $X=KL+M$, wherein, X is the page flipping speed, K is a constant coefficient of the corresponding relationship between the distance or variation of distance between the object and the mobile phone and the page flipping speed, L is the real-time distance or real-time variation of distance between the object and the mobile, M is the initial page flipping speed (the initial page flipping speed may be zero, or other constant, and may be set according to specific situation). After the real-time distance or variation of distance between the object and the terminal is obtained, the page flipping speed corresponding to the current distance or variation of distance between the object and the mobile phone may be determined according to the above-mentioned equation of the linear corresponding relationship. If the corresponding relationship between the distance or variation of distance between the object and the mobile phone and the page flipping operation instructions preset by the presetting unit 41 is the corresponding relationship between the distance or variation of distance between the object and the mobile phone and the page flipping speed, and the corresponding relationship is set to be the exponential corresponding relationship, the corresponding relationship between the distance or variation of distance between the object and the mobile phone and the page flipping speed may be set to be $X=K^L+M$, wherein, X is the page flipping speed, K is a constant coefficient of the corresponding relationship between the distance or variation of distance between the object and the mobile phone and the page flipping speed, L is the real-time distance or real-time variation of distance between the object and the mobile phone, M is the initial page flipping speed (the initial page flipping speed may be zero, or other constant, and may be set according to specific situation). After the real-time distance or real-time variation of distance between the object and the mobile phone is obtained, the page flipping speed corresponding to the current distance or variation of distance between the object and the terminal may be determined according to the above-mentioned equation of the exponential corresponding relationship. According to the above-mentioned corresponding relationship, it can be set that when the distance between the object, e.g., the user's finger, and the mobile phone is closer to zero, the corresponding page flipping speed is higher, and when the distance between the object, e.g., the user's finger, and the mobile phone is closer to the page flipping trigger distance, the corresponding page flipping speed is lower. That is, when the user of the mobile phone wants to switches pages, the user puts his/her finger on the distance sensor of the mobile phone, causing the distance between the finger and the mobile phone to be less than or equal to the preset page flipping triggering distance. The processing unit 20 determines the corresponding page flipping speed according to the distance between the user's finger and the mobile phone. When the user wants to switch pages quickly, the user moves the finger to be close to the distance sensor to decrease the distance between the finger and the mobile phone, thus the page flipping speed increases. When the current page is close to the target page, the user moves the finger away from the distance sensor of the mobile phone to increase the distance between the finger and the mobile phone, thus the page flipping speed decreases.

When the presetting unit 40 presets the corresponding relationship between the distance or variation of distance between the object and the mobile phone and the page flipping operation instructions by the second presetting unit 42, the presetting unit 40 divides the distance or variation of distance between the object and the terminal into a number of distance intervals in advance, and sets page flipping speeds or page flipping directions each corresponding to one distance interval. Wherein, the corresponding relationship between the distance intervals and the page flipping speed may include the linear corresponding relationship, the exponential corresponding relationship, and other corresponding relationships. The second presetting unit 42 may divide the reference distance (e.g., the above-mentioned page flipping triggering distance) into a number of distance intervals in advance, and sets page flipping speeds each corresponding to one distance interval. After the processing unit 20 obtains the distance or variation of distance between the object and the mobile phone from the obtaining unit 10, the processing unit 20 determines that the obtained distance or variation of distance between the object and the mobile phone falls within which of the distance intervals, and determines the page flipping speed corresponding to the current distance or variation of distance between the object and the mobile phone according to the page flipping speed corresponding to the distance interval in combination with the corresponding relationship set by the second presetting unit 42. When the corresponding relationship between the distance intervals and the page flipping speed is the linear corresponding relationship, the corresponding relationship may be set to be $X=KN+M$, wherein, X is the page flipping speed, K is a constant coefficient of the corresponding relationship between the distance or variation of distance between the object and the terminal and the page flipping speed, N is the distance interval of the distance or variation of distance between the object and the terminal, M is the initial page flipping speed (the initial page flipping speed may be zero, or other constant, and may be set according to specific situation). After the real-time distance or real-time variation of distance between the object and the terminal is obtained, which of the distance intervals the distance or variation of distance falls within is determined, and the page flipping speed corresponding to the current distance or variation of distance between the object and the terminal is determined according to the above-mentioned equation of the linear corresponding relationship. When the corresponding relationship between the distance intervals and the page flipping speed is the exponential corresponding relationship, the corresponding relationship may be set to be $X=K^N+M$, wherein, X is the page flipping speed, K is a constant coefficient of the corresponding relationship between the distance or variation of distance between the object and the terminal and the page flipping speed, N is the distance interval of the distance or real-time variation of distance between the object and the terminal, M is the initial page flipping speed (the initial page flipping speed may be zero, or other constant, and may be set according to specific situation). After the real-time distance or real-time variation of distance between the object and the terminal is obtained, which of the distance intervals the distance or variation of distance falls within is determined, and the page flipping speed corresponding to the current distance or variation of distance between the object and the terminal is determined according to the above-mentioned equation of the exponential corresponding relationship. In detail, when the preset corresponding relationship between the distance or variation of distance between the object and the terminal and the page flipping operation instructions set by the second presetting unit 42 is the corresponding relationship between the distance intervals of the distance or variation of distance between the object and the terminal and the page flipping speed, the corresponding relationship may be set to be the other corresponding relationship. For example, the second presetting unit 42 divides the page flipping triggering distance (e.g., 8 cm) into a first distance interval (0-4 cm), a second distance interval (4-6 cm), a third distance interval (6-8 cm), and so on in advance. The page flipping speed corresponding to the distance interval of 0-4 cm (that is the first distance interval) is set to be 10 pictures per second, the page flipping speed corresponding to the distance interval of 4-6 cm (that is the second distance interval) is set to be 5 pictures per second, and the page flipping speed corresponding to the distance interval of 6-8 cm (that is the third distance interval) is set to be one picture per second. When the processing unit 10 determines that the distance between the user's finger or other object and the mobile phone is 3 cm, the processing unit 10 determines that the distance interval corresponding to the current distance between the object and the mobile phone is the first distance interval, and determines that the corresponding page flipping speed is 10 pictures per second, and the executing unit 30 switches pages according to the page flipping speed of 10 pictures per second. When the distance between the user's finger and the mobile phone increases to 7 cm, the processing unit 20 determines that the distance interval corresponding to the current distance between the object and the mobile phone is the third distance interval, and the corresponding page flipping speed is 1 picture per second, and the executing unit 30 switches pages according to the page flipping speed, and the page flipping speed decreases from 10 pictures per second to 1 picture per second. When the user wants to increase the page flipping speed, the user may move the finger to decrease the distance between the finger and the mobile phone.

In addition, the presetting unit 40 may further set the corresponding relationship between the distance or variation of distance between the object and the terminal and the page flipping operation instructions to be the corresponding relationship between the distance or variation of distance between the object and the terminal and the page flipping direction by the second presetting unit 42. The second presetting unit 42 may divide the page flipping triggering distance into two distance intervals in advance, and sets page flipping directions each corresponding to one distance interval. After the processing unit 20 obtains the distance between the object and the mobile phone, the processing unit 20 determines that the obtained distance falls within which of the distance intervals, determines the page flipping direction corresponding to the current distance between the object and the mobile phone according to the page flipping direction corresponding to the distance interval, and generates the corresponding page flipping operation instruction. For example, the second presetting unit 40 may equally divide the page flipping triggering distance (e.g., 8 cm) into two distance intervals, for example, the fourth distance interval (0-4 cm) and the fifth distance interval (4-8 cm), and set that the page flipping direction corresponding to 0-4 cm (that is the fourth distance interval) is one direction (e.g., page up), and the page flipping direction corresponding to 4-8 cm is another direction (e.g., page down). When the distance between the user's finger or other object and the mobile phone falls within the fourth distance interval, the processing unit 20 determines that the current page flipping direction is page up, and when the distance between the object and the mobile phone falls within the fifth distance interval, the processing unit 20 determines that the current page flipping direction is page down. For example, when the obtained distance between the user's finger and the mobile phone is 3 cm, the processing unit determines that the page flipping direction is page up, and the executing unit scrolls the file up to switch the page to the target page. When the obtained distance between the user's finger and the mobile phone is 5 cm, the processing unit determines that the page flipping direction is page down, and the executing unit scrolls the file down to switch the page to the target page.

In detail, when the presetting unit 40 presets the corresponding relationship between the distance or variation of distance between the object and the terminal and the page flipping operation instructions, the third presetting unit 43 assigns the total number of pages of a file according to the proportion relationship between the distance or variation of distance between the object and the terminal and a reference distance (e.g., the above-mentioned preset page flipping trigger distance) in advance, and sets that each corresponding relationship corresponds to a page count of page flipping or a target page number of page flipping. Specifically, the third presetting unit 43 may preset the page number corresponding to the proportion of the distance or variation of distance between the object and the mobile phone and the preset page flipping triggering distance (the page count of page flipping may be determined according to the corresponding page number), that is, each proportion is set to correspond to a page number. After the processing unit 20 obtains the distance or variation of distance between the object and the mobile phone, the processing unit 20 determines the proportion relationship between the obtained distance or variation of distance and the preset page flipping triggering distance, and determines the corresponding page number according to the determined proportion relationship. After the processing unit 20 determines the page number corresponding to the current distance or variation of distance between the object and the mobile phone, the executing unit 30 switches the current page to the page of the page number, that is, the target page. For example, the third presetting unit 43 sets that when the distance between the object and the mobile phone is 0, that is, the proportion between the distance between the object and the mobile phone and the page flipping triggering distance is 0, the corresponding page number is the last page number of an electronic book, that is, the page count of page flipping is the total number of pages of the electronic book. When the distance between the object and the mobile phone is 8 cm, that is, the proportion between the distance between the object and the mobile phone and the page flipping triggering distance is 1, the corresponding page number is the first page number of the electronic book, that is, the page count of page flipping is 1. When the distance between the object and the mobile phone is 4 cm, that is, the proportion between the distance between the object and the mobile phone and the page flipping triggering distance is 1:2, the corresponding page number is the page number of half of total number of pages of the electronic book, that is, the page count of page flipping is half of the total number of pages of the electronic book. When the proportion between the distance between the object and the mobile phone and the page flipping triggering distance is not an integer, the corresponding page number is the page number indicated by an integer which is the integer the proportion is rounded up or down to, and the page count of page flipping is the page count corresponding to the corresponding page number. When the distance between the user's finger and the mobile phone is 2 cm, the processing unit 20 determines that the proportion between the current distance (2 cm) and the preset page flipping triggering distance (8 cm) is 1:4, and the executing unit 30 switches the current page to the page of the page number of a quarter of the total number of pages of the electronic book. When the distance between the user's finger and the mobile phone is 6 cm, the processing unit 20 determines that the proportion between the current distance (6 cm) and the preset page flipping triggering distance (8 cm) is 3:4, and the executing unit 30 switches the current page to the page of the page number of three quarters of the total number of pages of the electronic book.

In detail, when the presetting unit 30 sets the corresponding relationship between the distance or variation of distance between the object and the terminal and the page flipping operation instructions, the above-mentioned methods of setting the corresponding relationship between the distance or variation of distance between the object and the terminal and the page flipping operation instructions may be used alone, or may be used in combination with each other. That is, the presetting unit 40 may include any of the first presetting unit 41, the second presetting unit 42, and the third presetting unit 43, or a combination of two or more of the units, to make modes of page switch be more flexible and various. After the presetting unit 40 sets the corresponding relationship between the distance or variation of distance between the object and the terminal and the page flipping operation instructions, the processing unit 20 generates the corresponding page flipping operation instruction according to the corresponding relationship in combination with the distance or variation of distance between the object and the mobile phone, and the executing unit 30 executes the corresponding page flipping operation instruction to switch the current page to the target page.

In the embodiments of the present invention, the presetting unit presets the corresponding relationship between the distance or variation of distance between the object and the terminal and the page flipping operation instructions, and the processing unit generates the corresponding page flipping operation instruction according to the obtained distance or variation of distance between the object (e.g., the user's finger) and the mobile phone obtained by the obtaining unit, and the executing unit executes the corresponding page flipping operation instruction to switch the current page to the target page, making the modes of page flipping be variety, increasing the efficiency of page flipping, and improving user's experience.

Figure 3:
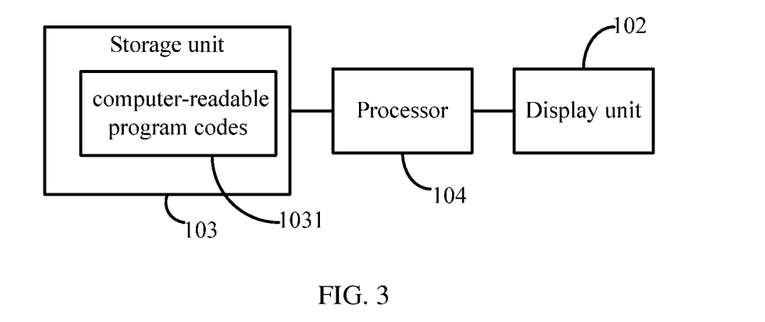
FIG. 3 is a schematic diagram of a terminal provided by an exemplary embodiment of the present invention.

Referring to FIG. 3, it is a schematic diagram of a terminal provided by an exemplary embodiment of present disclosure. The terminal can include but not limited to a display unit 102, a storage unit 103, and a processor 104. The display unit 102, and the storage unit 103 are electrically connected to the processor 104.

The display unit 102 is configured to display visual information, such as text, image, for example. The display unit 102 may be an LED display screen.

The storage unit 103 is configured to store a plurality of computer-readable program codes 1031. The storage unit 103 can be a read only memory (ROM), a random access memory (RAM), a U-disk, a removable hard disk, etc.

The processor 104 can include multiple cores for multithread or parallel processing. In this embodiment, the processor 104 is configured to execute the plurality of computer-readable program codes 1031 to obtain a distance or variation of distance between an object and a terminal and on a designated direction of the terminal, generate a page flipping operation instruction corresponding to the distance or variation of distance between the object and the terminal according to a preset corresponding relationship between the distance or variation of distance between the object and the terminal and page flipping operation instructions, and execute the page flipping operation instruction.

In this embodiment, the designated direction of the terminal includes a motion direction of the terminal or a measurement direction of the terminal.

In this embodiment, the page flipping operation instructions include at least one of page flipping directions, page flipping speeds, page count of page flipping, and page flipping according to proportions.

In this embodiment, before the processor 104 is configured to execute the plurality of program codes 1031 to generate a page flipping operation instruction corresponding to the distance or variation of distance between the object and the terminal according to the corresponding relationship between the distance or variation of distance between the object and the terminal and page flipping operation instructions, the processor 104 is further configured to execute the plurality of program codes 1031 to set the corresponding relationship between the distance or variation of distance between the object and the terminal and the page flipping operation instructions.

In this embodiment, the processor 104 is configured to execute the plurality of computer-readable program codes 1031 to set page flipping speeds each corresponding to one distance or variation of distance between the object and the terminal. Wherein, the corresponding relationship between the distance or variation of distance between the object and the terminal and the page flipping speeds includes at least one of the linear corresponding relationship and the exponential corresponding relationship.

In this embodiment, the processor 104 is configured to execute the plurality of program codes 1031 to divide the distance or variation of distance between the object and the terminal into a plurality of distance intervals, and setting page flipping speeds or page flipping directions each corresponding to one distance interval. Wherein, the corresponding relationship between the distance interval and the page flipping speeds comprises at least one of the linear corresponding relationship and the exponential corresponding relationship.

In this embodiment, the processor 104 is configured to execute the plurality of computer-readable program codes 1031 to assign the total number of pages of a file according to a proportion relationship between the distance or variation of distance between the object and the terminal and a reference distance, and set that each proportion corresponds to a page count of page flipping or a target page number of page flipping.

The units or sub-units in all embodiments of the present invention can be realized by a universal integrated circuit, such as a CPU (central processing unit, CPU) for example, or by an ASIC (application specific integrated circuit, ASIC).

One of ordinary skill in the art can understand that all or part of process can be accomplished by using a computer program to instruct related hardware. All the program can be stored in a computer-readable storage medium. When the program is executed, the process of the embodiments of the above-mentioned methods can be included. Wherein, the storage medium can be a magnetic disk, an optical disk, a ROM (Read-Only Memory, ROM), a RAM (Random Access Memory, RAM), or the like.

The embodiments described above are merely preferred ones of the present disclosure but are not limitations to the protection scope of the present disclosure, thus equivalent variations made according to the appended claims of the present invention still fall within the scope of the present invention.

What is claimed is:

1. A method for controlling page flipping of a terminal, comprising:
    obtaining a distance or variation of distance between an object and a terminal and on a designated direction of the terminal;
    setting a corresponding relationship between the distance or variation of distance between the object and the terminal and page flipping operation instructions;
    generating a page flipping operation instruction corresponding to the distance or variation of distance between the object and the terminal according to the corresponding relationship between the distance or variation of distance between the object and the terminal and the page flipping operation instructions;
    executing the page flipping operation instruction.

2. The method of claim 1, wherein setting the corresponding relationship between the distance or variation of distance between the object and the terminal and the page flipping operation instructions comprises:
    setting page flipping speeds each corresponding to one distance or variation of distance between the object and the terminal;
    wherein, the corresponding relationship between the distance or variation of distance between the object and the terminal and the page flipping speeds comprises at least one of the linear corresponding relationship and the exponential corresponding relationship.

3. The method of claim 1, wherein setting the corresponding relationship between the distance or variation of distance between the object and the terminal and the page flipping operation instructions comprises:
    dividing the distance or variation of distance between the object and the terminal into a plurality of distance intervals, and setting page flipping speeds or page flipping directions each corresponding to one distance interval;
    wherein, the corresponding relationship between the distance interval and the page flipping speeds comprises at least one of the linear corresponding relationship and the exponential corresponding relationship.

4. The method of claim 1, wherein setting the corresponding relationship between the distance or variation of distance between the object and the terminal and the page flipping operation instructions comprises:
    assigning the total number of pages of a file according to a proportion relationship between the distance or variation of distance between the object and the terminal and a reference distance, and setting that each proportion corresponds to a page count of page flipping or a target page number of page flipping.

5. A terminal comprising:
    a storage unit storing a plurality of computer-readable program codes; and
    a processor electrically connected to the storage unit and configured to execute the plurality of computer-readable program codes to:
        obtain a distance or variation of distance between an object and a terminal and on a designated direction of the terminal;
        set a corresponding relationship between the distance or variation of distance between the object and the terminal and page flipping operation instructions;
        generate a page flipping operation instruction corresponding to the distance or variation of distance between the object and the terminal according to the corresponding relationship between the distance or variation of distance between the object and the terminal and the page flipping operation instructions; and
        execute the page flipping operation instruction.

6. The terminal of claim 5, wherein the processor being configured to execute the plurality of computer-readable program codes to set the corresponding relationship between the distance or variation of distance between the object and the terminal and the page flipping operation instructions comprises:
    setting page flipping speeds each corresponding to one distance or variation of distance between the object and the terminal;
    wherein, the corresponding relationship between the distance or variation of distance between the object and the terminal and the page flipping speeds comprises at least one of the linear corresponding relationship and the exponential corresponding relationship.

7. The terminal of claim 5, wherein the processor being configured to execute the plurality of program codes to set the corresponding relationship between the distance or variation of distance between the object and the terminal and the page flipping operation instructions comprises:

dividing the distance or variation of distance between the object and the terminal into a plurality of distance intervals, and setting page flipping speeds or page flipping directions each corresponding to one distance interval;

wherein, the corresponding relationship between the distance interval and the page flipping speeds comprises at least one of the linear corresponding relationship and the exponential corresponding relationship.

8. The terminal of claim 5, wherein the processor being configured to execute the plurality of program codes to set the corresponding relationship between the distance or variation of distance between the object and the terminal and the page flipping operation instructions comprises:

assigning the total number of pages of a file according to a proportion relationship between the distance or variation of distance between the object and the terminal and a reference distance, and setting that each proportion corresponds to a page count of page flipping or a target page number of page flipping.

9. The method of claim 2, wherein the designated direction of the terminal comprises a motion direction of the terminal or a measurement direction of the terminal.

10. The method of claim 3, wherein the designated direction of the terminal comprises a motion direction of the terminal or a measurement direction of the terminal.

11. The method of claim 4, wherein the designated direction of the terminal comprises a motion direction of the terminal or a measurement direction of the terminal.

12. The method of claim 2, wherein the page flipping operation instructions comprises at least one of page flipping directions, page flipping speeds, page count of page flipping, and page flipping according to proportions.

13. The method of claim 3, wherein the page flipping operation instructions comprises at least one of page flipping directions, page flipping speeds, page count of page flipping, and page flipping according to proportions.

14. The method of claim 4, wherein the page flipping operation instructions comprises at least one of page flipping directions, page flipping speeds, page count of page flipping, and page flipping according to proportions.

15. The terminal of claim 6, wherein the designated direction of the terminal comprises a motion direction of the terminal or a measurement direction of the terminal.

16. The terminal of claim 7, wherein the designated direction of the terminal comprises a motion direction of the terminal or a measurement direction of the terminal.

17. The terminal of claim 8, wherein the designated direction of the terminal comprises a motion direction of the terminal or a measurement direction of the terminal.

18. The terminal of claim 6, wherein the page flipping operation instructions comprise at least one of page flipping directions, page flipping speeds, page count of page flipping, and page flipping according to proportions.

19. The terminal of claim 7, wherein the page flipping operation instructions comprise at least one of page flipping directions, page flipping speeds, page count of page flipping, and page flipping according to proportions.

20. The terminal of claim 8, wherein the page flipping operation instructions comprise at least one of page flipping directions, page flipping speeds, page count of page flipping, and page flipping according to proportions.

* * * * *